(12) United States Patent
Zhang et al.

(10) Patent No.: US 8,380,011 B2
(45) Date of Patent: Feb. 19, 2013

(54) FAST DIRECTIONAL IMAGE INTERPOLATOR WITH DIFFERENCE PROJECTION

(75) Inventors: Yonghua Zhang, Beijing (CN); Zhiwei Xiong, Beijing (CN); Feng Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1067 days.

(21) Appl. No.: 12/241,106

(22) Filed: Sep. 30, 2008

(65) Prior Publication Data

US 2010/0080488 A1 Apr. 1, 2010

(51) Int. Cl.
*G06K 9/32* (2006.01)
(52) U.S. Cl. ........ 382/300; 382/299; 382/276; 382/293; 382/298; 382/155; 382/156; 382/161; 382/199; 348/458; 348/240; 348/365
(58) Field of Classification Search ................... 382/300, 382/299, 276, 293, 298, 155, 156, 161, 199; 348/458, 240, 365
See application file for complete search history.

(56) References Cited

U.S. PATENT DOCUMENTS

| | | | |
|---|---|---|---|
| 5,917,963 A | 6/1999 | Miyake | |
| 6,832,009 B1 | 12/2004 | Shezaf et al. | |
| 7,088,392 B2 | 8/2006 | Kakarala et al. | |
| 7,136,541 B2 | 11/2006 | Zhang et al. | |
| 7,242,819 B2 | 7/2007 | Jiang | |
| 2007/0247530 A1 | 10/2007 | Takahasi et al. | |
| 2007/0291170 A1 | 12/2007 | Han et al. | |
| 2008/0055338 A1 | 3/2008 | Wei et al. | |
| 2008/0089409 A1 | 4/2008 | Xu et al. | |

OTHER PUBLICATIONS

Park, et al., "Recovery of Image Blocks Using the Method of Alternating Projections", IEEE Transactions on Image Processing, vol. 14, No. 4, Apr. 2005, pp. 461-474.
Su, et al., "Image Interpolation by Pixel Level Data-Dependent Triangulation", Computer Graphics Forum, vol. xx (200y), No. z, 2001, pp. 1-13.
Yu, et al., "A Segmentation-Based Method for Metal Artifact Reduction", Techinal Report, Academic Radiology, vol. 14, No. 4, 2007, pp. 495-504.
Jiang, et al., "A new direction adaptive scheme for image interpolation",International Conference on Image Processing (ICIP'02), vol. 3, 2002, pp. 1-4.
Chan, et al., "A novel content-adaptive interpolation", IEEE International Symposium on Circuits and Systems, ISCAS 2005. vol. 6, May 23-26, 2005, pp. 6260-6263.
Wang, et al., "A new orientation-adaptive interpolation method", IEEE Transactions on Image Processing, vol. 16, No. 4, Apr. 2007, pp. 889-900.
Mori, et al., "Image resolution conversion based on an edge-adaptive interpolation kernel", PACRIM'07, IEEE, 2007, pp. 497-500.

(Continued)

*Primary Examiner* — Mike Rahmjoo
(74) *Attorney, Agent, or Firm* — Gonzalez Saggio & Harlan LLP

(57) ABSTRACT

Described is a technology in which a low resolution image is processed into a high-resolution image, including by a two interpolation passes. In the first pass, missing in-block pixels, which are the pixels within a block formed by four neighboring original pixels, are given values by gradient diffusion based upon interpolation of the surrounding original pixels. In the second interpolation pass, missing on-block pixels, which are the pixels on a block edge formed by two adjacent original pixels, are given values by gradient diffusion based upon interpolation of the values of those adjacent original pixels and the previously interpolated values of their adjacent in-block pixels. Also described is a difference projection process that varies the values of the interpolated pixels according to a computed difference projection.

13 Claims, 5 Drawing Sheets

OTHER PUBLICATIONS

Erik Meijering, "A chronology of interpolation: From ancient astronomy to modem signal and image processing", Proceedings of the IEEE, vol. 90, No. 3, Mar. 2002, pp. 319-342.

Muresan, et al., "Adaptively quadratic(aqua) image interpolation", IEEE Transactions on Image Processing, vol. XX, No. Y, Month 2002, pp. 1-24.

Morse, et al., "Image magnification using level-set reconstruction", IEEE Computer Society Conference on Computer Vision and Pattern Recognition, CVPR 2001, vol. 1, pp. 333-340.

Li, et al., "New edge-directed interpolation", IEEE Transactions on Image Processing, vol. 10, No. 10, Oct. 2001, pp. 1521-1527.

Zhang, et al., "An edge-guided image interpolation algorithm via directional filtering and data fusion", IEEE transactions on image processing, vol. 15, 2006, pp. 1-27.

FAST DIRECTIONAL IMAGE INTERPOLATOR WITH DIFFERENCE PROJECTION

BACKGROUND

Increasing the resolution of images is useful in providing viewers with a better observation experience. To this end, image interpolation is used in many real world applications to fill in missing pixels generally based on surrounding information. In general, two criteria are used to evaluate the performance of an image interpolator, namely perceptual quality and computational complexity.

Conventional linear operators like bilinear and bicubic image interpolation are relatively simple and fast, but often introduce annoying "baggy" artifacts around the edges, primarily because local features in images are not taken into consideration. Therefore, various adaptive image interpolators have been implemented in an attempt to better preserve the edges, by utilizing more accurate models.

However, such models suffer from a number of drawbacks, including computational inefficiency. For example, due to the iterative property and/or significant complexity of reliable estimation of adaptive coefficients, the overall computational cost may be much higher than that of linear interpolators, even when hybrid algorithms are used to reduce the complexity.

Another drawback is that some models limit edge orientations to several predefined choices, which affects the accuracy of the imposed model. Other interpolators have a limited interpolation ratio, that is, many interpolators are restricted to a ratio of $2^n$; interpolation to another ratio requires re-sampling from a higher $2^n$ image.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a low resolution image is processed into a high-resolution image, including by a two pass interpolation. In a first pass, a first set of pixel values are interpolated for a first set of missing pixels based on original pixel values. In a second pass, a second set of pixel values are interpolated for a second set of missing pixels based on the original pixel values and the interpolated first set of pixel values.

In one aspect, the first set of pixels contains in-block pixels, in which each in-block pixel corresponds to a pixel location within a block formed by four of the original pixels. The second set of pixels contains on-block pixels, in which each on-block pixel corresponds to a pixel location on an edge formed by two of the original pixels.

In one aspect, a difference projection is performed on the interpolated pixels. The difference projection may be performed by computing virtual interpolation values for the original pixels from the surrounding interpolated pixels, computing the differences between the original pixels and the virtual interpolation values, and then adjusting values of interpolated pixels by the projected differences, e.g., adding the projected differences.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a directional interpolator in which gradients are diffused for the high-resolution image to determine the orientations of local minimum variation at missing pixels, along which linear interpolation is performed. In this manner, arbitrary edge orientations can be detected and utilized. Then, the continuities between original and interpolated pixels are enforced by "difference projection", which can be viewed as a reapplication of the described interpolator.

While some of the examples described herein are directed towards an interpolator based on gradient diffusion and bilinear interpolation, it is understood that these are only examples. Other types of interpolation may be performed. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and image processing in general.

Figure 1:
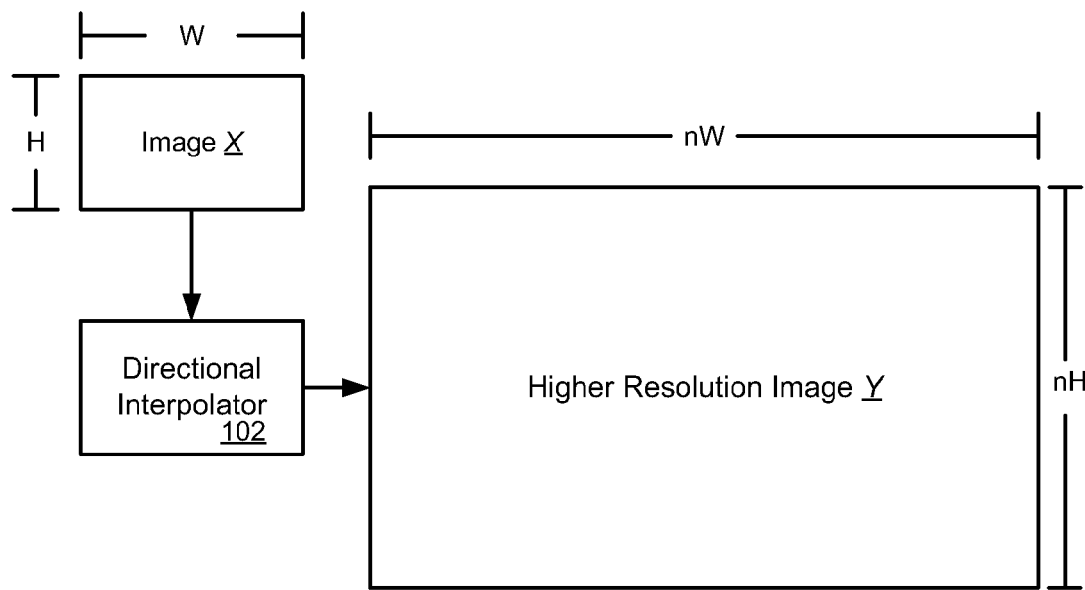
FIG. 1 is a block diagram showing an example directional image interpolator with difference projection that interpolates a low resolution image into a high resolution image.

Turning to FIG. 1, there is shown a directional interpolator 102 comprising an algorithm that interpolates a low-resolution image X of size H×W into a high-resolution image Y of size nH×nW. For purposes of concise description herein, and without loss of generality, the examples use n=3; thus, 3× interpolation is used as an example, which may be easily extended to other, n× interpolation.

Figure 2:
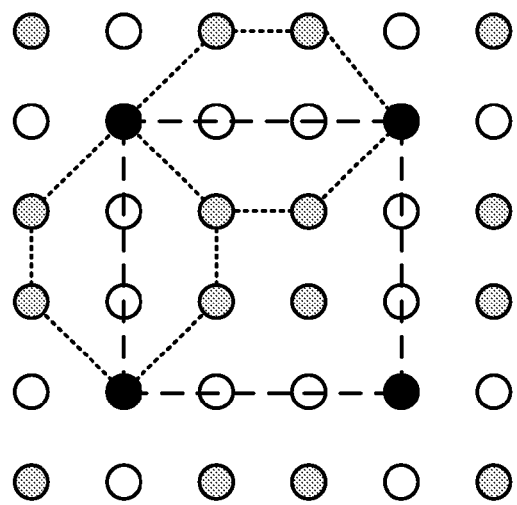
FIG. 2 is a representation of pixels including original pixels, in-block pixels to be interpolated and on-block pixels to be interpolated.

As illustrated in FIG. 2, the pixels in image Y (thirty-six are shown) are divided into three categories. The black dots represent copies of original the pixels from X; the gray and white dots are the missing pixels to be interpolated into the pixel space. With the four neighboring black dots forming a square block (marked via the dashed line), the gray dots within the dashed block are referred to as "in-block" pixels. The white dots are on edges formed by two adjacent original pixels, (on a dashed line) and are referred to as "on-block" pixels.

In one method, the "in-block" interpolation is first performed in the square to generate pixel values for the gray dots, (as generally represented via steps 702-704 of FIG. 7) and then the "on-block" interpolation is carried out in two hexagons (marked via the dotted lines and shown in FIG. 4 and via steps 706-708 of FIG. 7) to generate pixel values for the white dots. This two-pass strategy exploits the correlations between neighboring pixels, compared with one-pass algorithms that in essence only use the original pixels (the black dots herein). The fixed positions of available neighbors facilitate the implementation.

In one implementation, gradient diffusion is used for interpolation. More particularly, the weights of available pixels for interpolation are determined by the estimated gradient of the missing pixel. In general, the orientation of local minimum variation at a certain pixel can be derived from the direction of its gradient, as they are perpendicular to each other. Thus the interpolator makes use of various edge orientations with gradient-adaptive interpolation weights.

To obtain the gradients of missing pixels in Y, the gradients on X are first calculated, and then bilinearly interpolated to the high-resolution. This process is referred to as "gradient diffusion". More particularly, there is a kind of edge pixel referred as a "ridge" whose gradient value is near zero. The process marks these pixels separately and estimates the edge orientations from their neighborhood.

Figure 3:
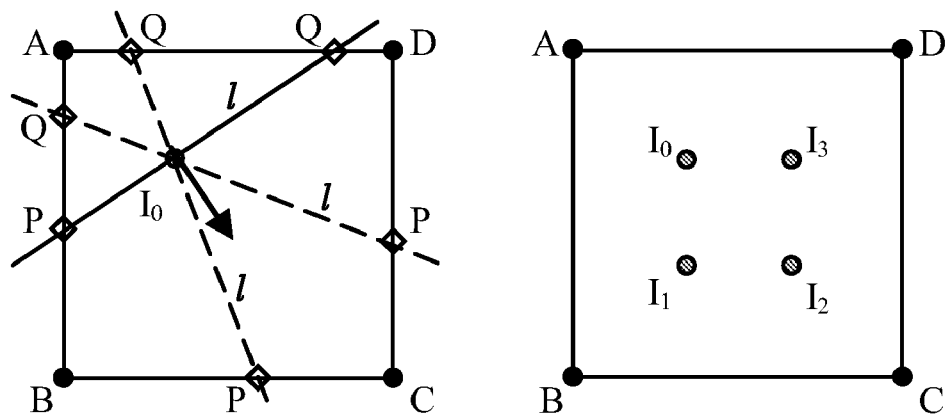
FIG. 3 is a representation of interpolation of an in-block pixel based on its relationship to original pixels.

After the high-resolution gradients are obtained, the four in-block pixels are interpolated as indexed by $I_0, I_1, I_2$ and $I_3$ in the right portion of FIG. 3. Because they are symmetric in geometry, only the interpolation of $I_0$ is shown as an example for purposes of brevity herein.

As shown in the left portion of FIG. 3, there is a line/ perpendicular to the gradient direction (denoted by the arrow) at $I_0$, along which the local variation is minimum. The line/ has two intersections, P and Q, with the square formed by the original pixels A, B, C and D. There are three kinds of distributions of P and Q according to different slopes of I (denoted as k). With the gradient of $I_0$, k is calculated and P and Q located.

P and Q are generated by linear interpolation with the two vertices of the square side on which they are situated. Then P and Q are used to interpolate $I_0$, linearly. The following interpolation formula is deduced, in which the coefficients of available pixels are directly calculated from k:

$$I_0 = (\alpha_A, \alpha_B, \alpha_C, \alpha_D)(A, B, C, D)^T \quad (1)$$

Here the indices of pixels also refer to their intensity value. Due to the geometric symmetry, the same weights can be used for $I_1, I_2$ and $I_3$ by mirroring A, B, C, D and I.

Table 1 gives corresponding weights with respect to k. The permutation of available pixels and the transformed slope are shown in Table 2.

TABLE 1

In-block interpolation weights:

| k | $(-\infty, -1] \cup [2, +\infty)$ | $[-1, \frac{1}{2}]$ | $[\frac{1}{2}, 2]$ |
|---|---|---|---|
| $\alpha_A$ | $(4k - 2)/9k$ | $(4 - 2k)/9$ | $\frac{1}{3}$ |
| $\alpha_B$ | $(2k + 2)/9k$ | $(2 + 2k)/9$ | $\frac{1}{3}$ |
| $\alpha_C$ | $(k - 2)/9k$ | $(1 - 2k)/9$ | $0$ |
| $\alpha_D$ | $(2k + 2)/9k$ | $(2 + 2k)/9$ | $\frac{1}{3}$ |

TABLE 2

In-block interpolation mirroring

| $I_0$ | A | B | C | D | k |
| $I_1$ | B | A | D | C | -k |
| $I_2$ | C | D | A | B | k |
| $I_3$ | D | C | B | A | -k |

Figure 4:
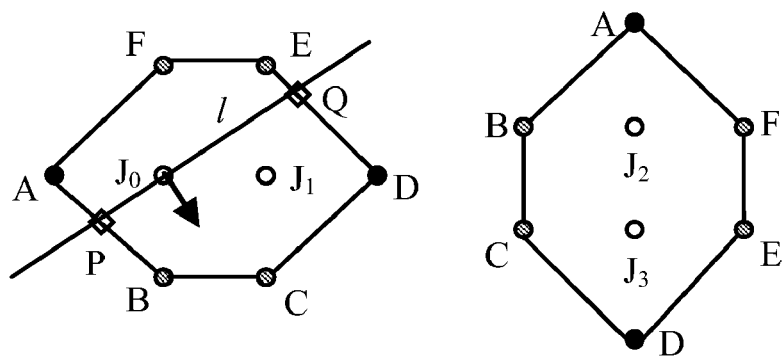
FIG. 4 is a representation of interpolation of an on-block pixel based on its relationship to original pixels and in-block pixels.
Figure 7:
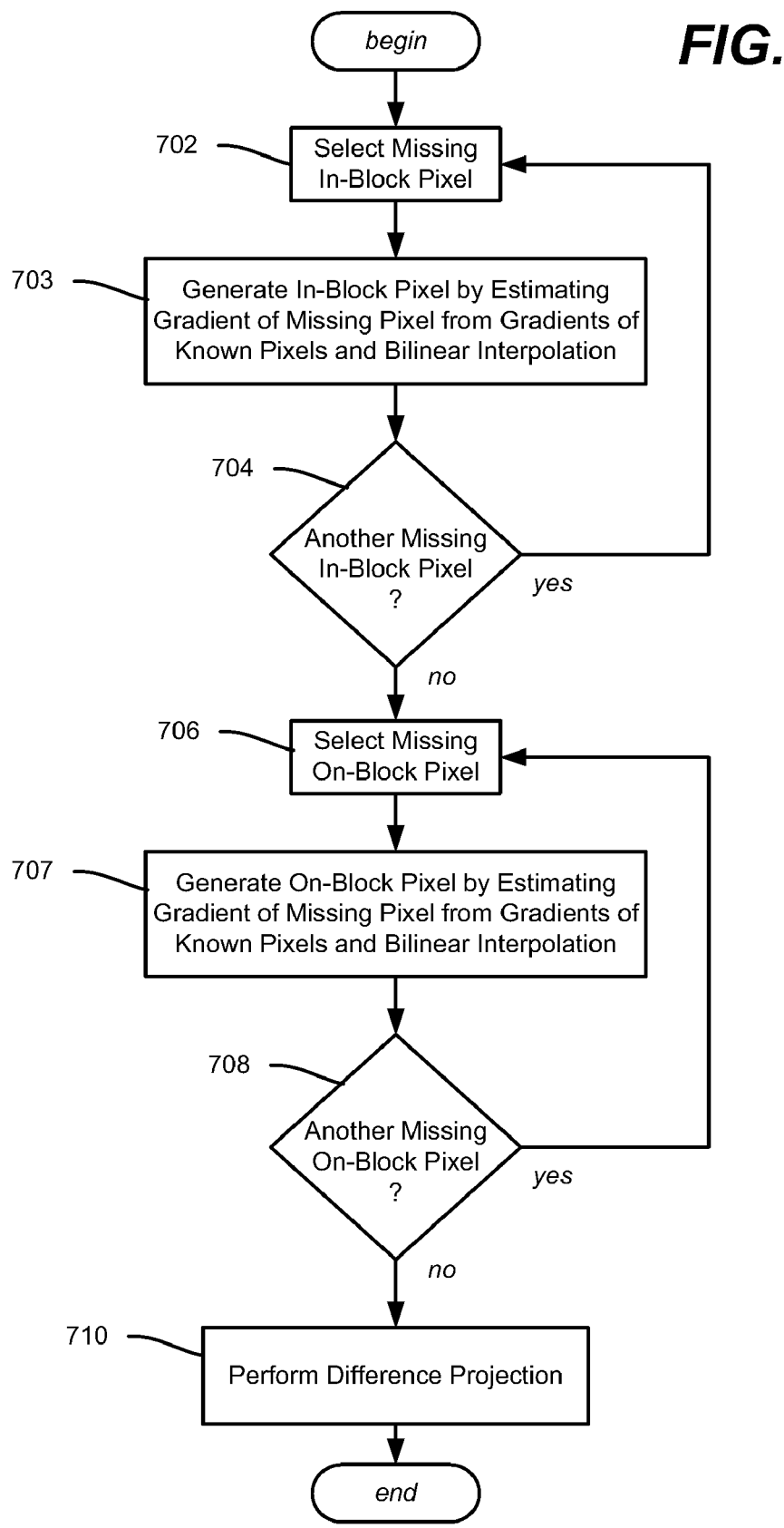
FIG. 7 is a flow diagram representing example steps for interpolating a low resolution image into a higher resolution image.

When the in-block pixels are generated, the on-block pixels in the two hexagons formed by the original and in-block pixels are interpolated, as illustrated in FIG. 4 and in steps 706-708 of FIG. 7. The procedure of on-block interpolation is similar to that of in-block interpolation, which can be formulated as:

$$J_0 = (\alpha_A, \alpha_B, \alpha_C, \alpha_D, \alpha_E, \alpha_F)(A, B, C, D, E, F)^T \quad (2)$$

The interpolation weights, the available pixel permutation and the transformed slope are listed in Table 3 and Table 4:

TABLE 3

On-block interpolation weights:

| k | $(-\infty, -1]$ | $[-1, 0]$ | $[0, 1]$ | $[1, +\infty)$ |
|---|---|---|---|---|
| $\alpha_A$ | $1/(1 - 2k)$ | $2/(3 - 3k)$ | $2/(3 + 3k)$ | $1/(1 + 2k)$ |
| $\alpha_B$ | $-(1 + k)/(1 - 2k)$ | $0$ | $2k/(3 + 3k)$ | $k/(1 + 2k)$ |
| $\alpha_C$ | $1/(1 - 2k)$ | $-2k/(3 - 3k)$ | $0$ | $0$ |
| $\alpha_D$ | $0$ | $(1 + k)/(3 - 3k)$ | $(1 - k)/(3 + 3k)$ | $0$ |
| $\alpha_E$ | $0$ | $0$ | $2k/(3 + 3k)$ | $1/(1 + 2k)$ |
| $\alpha_F$ | $-k/(1 - 2k)$ | $-2k/(3 - 3k)$ | $0$ | $(k - 1)/(1 + 2k)$ |

TABLE 4

On-block interpolation mirroring:

| $J_0$ | A | B | C | D | E | F | k |
| $J_1$ | D | C | B | A | F | E | -k |
| $J_2$ | A | B | C | D | E | F | 1/k |
| $J_3$ | D | C | B | A | F | E | -1/k |

As can be seen, both the in-block and on-block interpolations are performed in a uniform manner, which are favorable to simple and fast implementation.

Compared with high-order interpolators, there is a disadvantage to first-order interpolation such as bilinear and other methods, namely that the continuities between original and interpolated pixels are not well preserved, because fewer pixels are involved for interpolation. In order to solve this problem, a "difference projection" process is used, as generally represented by step 710 of FIG. 7.

Figure 5:
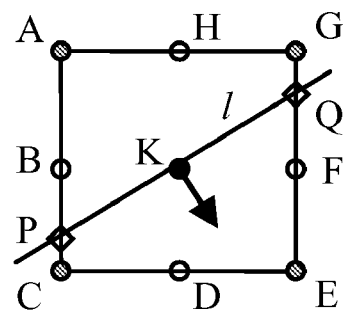
FIG. 5 is a representation of a virtual original interpolation layout.

More particularly, because the original pixels from low resolution image X are reliable, they are not directly modified to enforce the continuity of high resolution image Y. Instead, a "virtual" interpolation is performed at each original pixel according to equation (3) and (with FIG. 5 and Table 5), calculating the difference between its previous and interpolated value. This difference is then propagated to other pixels by employing the interpolator again, for which the adopted gradients are the same as used before.

$$K = (\alpha_A, \alpha_B, \alpha_C, \alpha_D, \alpha_E, \alpha_F, \alpha_G, \alpha_H)(A, B, C, D, E, F, G, H)^T \quad (3)$$

TABLE 5

| Virtual original interpolation weights: | | | | |
|---|---|---|---|---|
| k | $(-\infty, -1]$ | $[-1, 0]$ | $[0, 1]$ | $[1, +\infty)$ |
| $\alpha_A$ | $-\frac{1}{2}k$ | $-k/2$ | 0 | 0 |
| $\alpha_B$ | 0 | $(1+k)/2$ | $(1-k)/2$ | 0 |
| $\alpha_C$ | 0 | 0 | $k/2$ | $\frac{1}{2}k$ |
| $\alpha_D$ | $(1+k)/2k$ | 0 | 0 | $(k-1)/2k$ |
| $\alpha_E$ | $-\frac{1}{2}k$ | $-k/2$ | 0 | 0 |
| $\alpha_F$ | 0 | $(1+k)/2$ | $(1-k)/2$ | 0 |
| $\alpha_G$ | 0 | 0 | $k/2$ | $\frac{1}{2}k$ |
| $\alpha_H$ | $(1+k)/2k$ | 0 | 0 | $(k-1)/2k$ |

Figure 6:
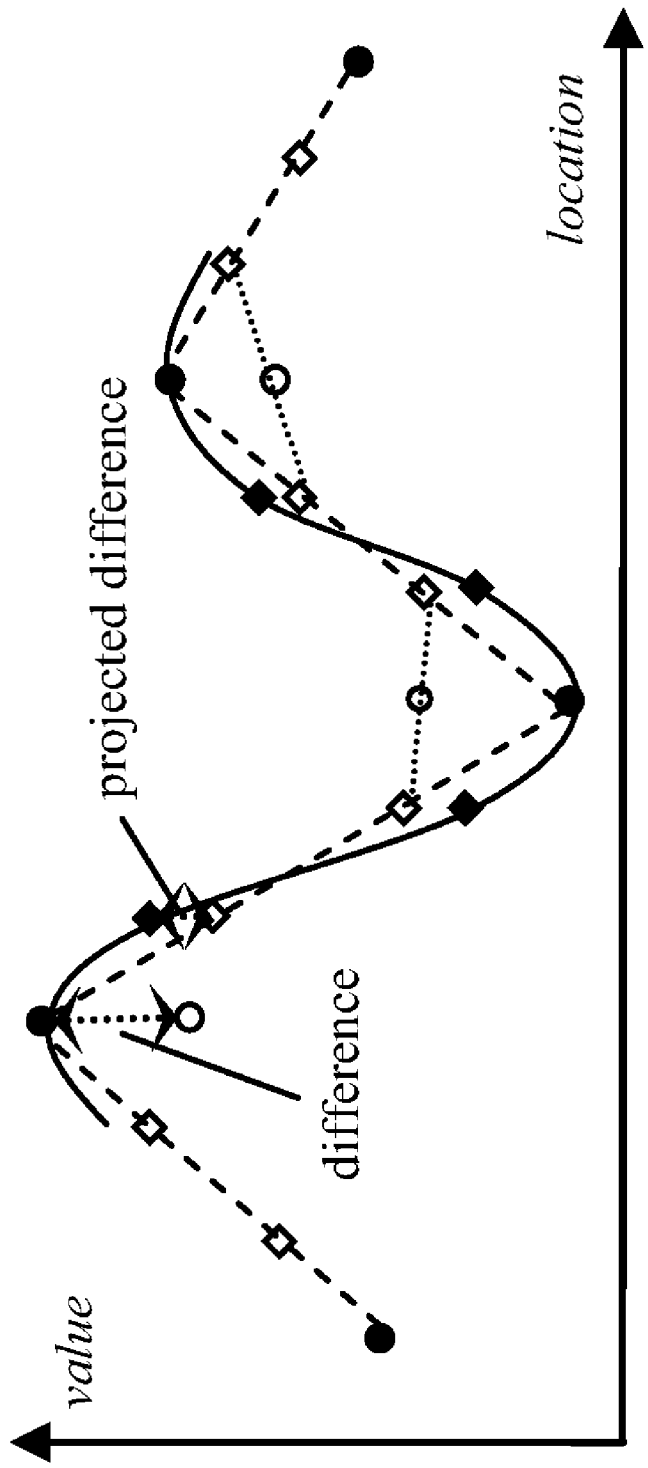
FIG. 6 is a representation of difference projection.

FIG. 6 illustrates the difference projection in a one-dimensional case, where the black dots indicate the original pixels, the white diamonds the interpolated pixels, the white dots the virtual interpolated originals, and the black diamonds the rectified interpolated ones. The dashed line represents the signal before difference projection, and the solid line after difference projection.

It can be observed that once the projected differences are added to the interpolated pixels, the continuities at original pixels are enforced while their values remain unchanged. The interpolation algorithm can be formulated as:

$$Y = F^+(\tilde{X}) + F(F(\tilde{X}) - F^+(\tilde{X})) \quad (4)$$

F denotes the combination of in-block and on-block interpolation, and $F^+$ includes the virtual original interpolation as well as F. $\tilde{X}$ is a high-resolution image with original copies from X at the black dots and zero at the gray and white dots.

With respect to computational complexity of the described algorithm, in terms of the multiplication times per missing pixel, three procedures are included, namely gradient diffusion, in-block and on-block interpolation, and difference projection. The multiplications used are 4.0, 4.0 and 4.5 (0.5 for virtual original interpolation), respectively. The interpolation weights only cost 3.5 multiplications (including 1 for calculating k) on average due to their similarity. Therefore, the complexity of the interpolator described herein is relatively low in implementation. It is even faster by clipping k to zero at the locations with small gradients (i.e. smooth image regions, which often cover the majority of an image), where the interpolation weights degrade to the predefined coefficients of bilinear interpolation. The computation for these weights can thus be saved. Also, difference projection is typically not necessary in these regions.

There is thus described is a new directional image interpolator, which aims at achieving high perceptual quality with low computational complexity. The missing pixels in a high-resolution image are generated with their available neighbors in certain fixed positions, whose weights are determined by the gradients diffused from the low-resolution image. Afterwards, the continuity of the interpolated image is enforced by a difference projection process. Due to its adaptiveness and uniformity, the described interpolator preserves edges in various orientations. Further, the interpolation ratio can be of any integer. Experimental results show that this interpolator achieves better perceptual and objective quality compared with bilinear and bicubic interpolation, as well as known existing adaptive methods.

Exemplary Operating Environment

Figure 8:
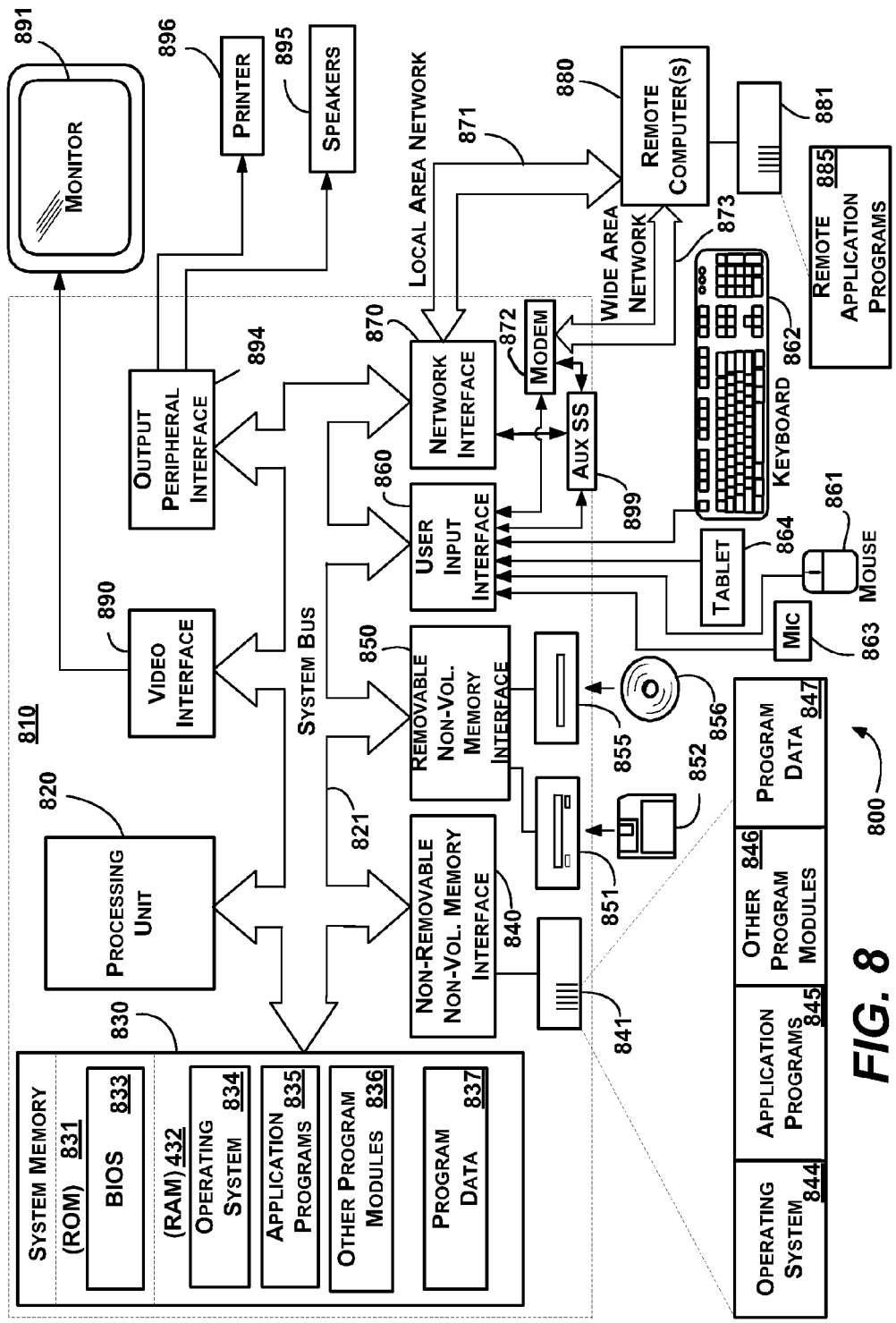
FIG. 8 shows an illustrative example of a computing environment into which various aspects of the present invention may be incorporated.

FIG. 8 illustrates an example of a suitable computing and networking environment 800 on which the examples of FIGS. 1-7 may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 8, an exemplary system for implementing various aspects of the invention may include a general purpose computing device in the form of a computer 810. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer-readable media. Computer-readable media can be any available media that can be accessed by the computer 810 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 810. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above may also be included within the scope of computer-readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836 and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media, described above and illustrated in FIG. 8, provide storage of computer-readable instructions, data structures, program modules and other data for the computer 810. In FIG. 8, for example, hard disk drive 841 is illustrated as storing operating system 844, application programs 845, other program modules 846 and program data 847. Note that these components can either be the same as or different from operating system 834, application programs 835, other program modules 836, and program data 837. Operating system 844, application programs 845, other program modules 846, and program data 847 are given different numbers herein to illustrate that, at a minimum, they are different copies. A user may enter commands and information into the computer 810 through input devices such as a tablet, or electronic digitizer, 864, a microphone 863, a keyboard 862 and pointing device 861, commonly referred to as mouse, trackball or touch pad. Other input devices not shown in FIG. 8 may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. The monitor 891 may also be integrated with a touch-screen panel or the like. Note that the monitor and/or touch screen panel can be physically coupled to a housing in which the computing device 810 is incorporated, such as in a tablet-type personal computer. In addition, computers such as the computing device 810 may also include other peripheral output devices such as speakers 895 and printer 896, which may be connected through an output peripheral interface 894 or the like.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more local area networks (LAN) 871 and one or more wide area networks (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860 or other appropriate mechanism. A wireless networking component 874 such as comprising an interface and antenna may be coupled through a suitable device such as an access point or peer computer to a WAN or LAN. In a networked environment, program modules depicted relative to the computer 810, or portions thereof, may be stored in the remote memory storage device. By way of example, and not limitation, FIG. 8 illustrates remote application programs 885 as residing on memory device 881. It may be appreciated that the network connections shown are exemplary and other means of establishing a communications link between the computers may be used.

An auxiliary subsystem 899 (e.g., for auxiliary display of content) may be connected via the user interface 860 to allow data such as program content, system status and event notifications to be provided to the user, even if the main portions of the computer system are in a low power state. The auxiliary subsystem 899 may be connected to the modem 872 and/or network interface 870 to allow communication between these systems while the main processing unit 820 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:
1. In a computing environment, a method comprising:
receiving a low resolution image;
processing the low resolution image into a high resolution image by a two pass interpolation, including distributing original pixels from the low resolution image into the high resolution image, interpolating a first set of pixel values for a first set of missing pixels based on original pixel values of the original pixels from the low resolution image in a first pass interpolation, and interpolating a second set of pixel values for a second set of missing pixels based on the original pixel values and the interpolated first set of pixel values in a second pass interpolation; and generating the high resolution image using the original pixels, the interpolated first set of pixel values, and an interpolated second set of pixel values;

performing a difference projection on at least a subset of at least one of the interpolated first set of pixel values or the interpolated second set of pixel values;

computing virtual interpolation values for original pixels, and adjusting values of at least one of the interpolated first set of pixel values or the interpolated second set of pixel values by projected differences that are based on the virtual interpolation values.

2. The method of claim 1 wherein interpolating the first set of pixel values includes performing gradient diffusion.

3. The method of claim 1 further comprising:
selecting the first set of missing pixels as in-block pixels, in which each in-block pixel corresponds to a pixel location within a block formed by four of the original pixels.

4. The method of claim 1 further comprising:
selecting the second set of missing pixels as on-block pixels, in which each on-block pixel corresponds to a pixel location on an edge formed by two of the original pixels.

5. The method of claim 1 further comprising:
distinguishing ridge pixels.

6. In a computing environment, a system comprising:
one or more processors;
an interpolator, implemented on at least one of the one or more processors, to process a low resolution image into a high resolution image using a two pass interpolation, including a first interpolation pass that interpolates values for in-block pixels based on pixel values in the low resolution image, and a second interpolation pass that interpolates values for on-block pixels based on the pixel values in the low resolution image and the pixel values interpolated for the in-block pixels;
perform a difference projection on at least a subset of at least one of the pixel values interpolated for the in-block pixels or pixel values interpolated for the on-block pixels;
computing virtual interpolation values for the pixel values in the low resolution image, and adding projected differences based on the virtual interpolation values to at least one of the pixel values interpolated for the in-block pixels or the pixel values interpolated for the on-block pixels.

7. The system of claim 6 wherein the interpolator is further configured to interpolate pixel values for the in-block and on-block pixels via gradient diffusion.

8. The system of claim 6 wherein each in-block pixel corresponds to a pixel location within a block formed by four neighboring pixels of the low resolution image.

9. The system of claim 6 wherein each on-block pixel corresponds to a pixel location on an edge formed by two adjacent pixels of the low resolution image.

10. One or more computer storage devices having computer-executable instructions, which in response to execution by a computer, cause the computer to perform steps, comprising:
distributing original pixels of a low resolution image into a high resolution image such that the high resolution image includes the original pixels and missing pixels; and
determining values for the missing pixels to interpolate the high resolution image into an interpolated high resolution image using a two pass interpolation, including computing in-block pixel values based on pixel values of the original pixels in a first pass interpolation, and computing on-block pixel values based on the pixel values of the original pixels and the computed in-block pixel values a second pass interpolation;
for each in-block pixel, obtaining the values of four neighboring original pixels that form a block within which that in-block pixel is located, and interpolating the in-block pixel value for that in-block based on the obtained values;
performing a difference projection on at least some of the interpolated pixels;
computing virtual interpolation values for the original pixels, and adjusting values of interpolated pixels by projected differences that are based on the virtual interpolation values.

11. The one or more computer storage devices of claim 10 wherein computing the on-block pixel values comprises interpolating the on-block pixel values based on pixel values of the original pixels and pixel values interpolated for the in-block pixels.

12. The one or more computer storage devices of claim 11 wherein interpolating the on-block pixel values comprises, for each on-block pixel, obtaining pixel values for the two adjacent original pixels that form a block edge on which that on-block pixel is located.

13. The one or more computer storage devices of claim 11 wherein interpolating the on-block pixel values comprises, for each on-block pixel, obtaining pixel values for the in-block pixels that with the original adjacent pixels form a polygon within which that on-block pixel is located.

* * * * *